United States Patent
Murley et al.

(10) Patent No.: US 7,087,101 B2
(45) Date of Patent: Aug. 8, 2006

(54) METHOD OF CONTROLLING A GAS ADSORPTION APPARATUS

(75) Inventors: Kraig Charles Murley, Yeovil (GB); David John Peacey, Yeovil (GB); Terence Oborne, Yeovil (GB)

(73) Assignee: Honeywell Normalair-Garrett (Holdings) Limited, Yeovil (GB)

( * ) Notice: Subject to any disclaimer, the term of this patent is extended or adjusted under 35 U.S.C. 154(b) by 249 days.

(21) Appl. No.: 10/744,615

(22) Filed: Dec. 23, 2003

(65) Prior Publication Data

US 2004/0134349 A1 Jul. 15, 2004

(30) Foreign Application Priority Data

Dec. 24, 2002 (GB) .................................. 0230098.6

(51) Int. Cl.
*B01D 53/047* (2006.01)
(52) U.S. Cl. ................ 95/1; 95/12; 95/98; 95/130; 96/109; 96/130
(58) Field of Classification Search .............. 95/1, 95/8, 11, 12, 23, 96–106, 130; 96/109–111, 96/115, 130, 143, 144, 153, 154

See application file for complete search history.

(56) References Cited

U.S. PATENT DOCUMENTS

| | | | | |
|---|---|---|---|---|
| 3,703,068 A | * | 11/1972 | Wagner | 95/11 |
| 4,315,759 A | * | 2/1982 | Benkmann | 95/23 |
| 4,404,005 A | * | 9/1983 | Hamlin et al. | 96/111 |
| 4,561,287 A | * | 12/1985 | Rowland | 95/11 |
| 4,693,730 A | * | 9/1987 | Miller et al. | 95/8 |
| 4,927,434 A | * | 5/1990 | Cordes et al. | 95/15 |
| 5,004,485 A | * | 4/1991 | Hamlin et al. | 96/111 |
| 5,340,381 A | * | 8/1994 | Vorih | 95/21 |
| 5,858,063 A | * | 1/1999 | Cao et al. | 95/11 |
| 5,871,564 A | * | 2/1999 | McCombs | 95/98 |
| 5,906,672 A | * | 5/1999 | Michaels et al. | 95/12 |
| 5,917,135 A | * | 6/1999 | Michaels et al. | 95/11 |
| 6,063,161 A | * | 5/2000 | Keefer et al. | 95/100 |
| 6,077,331 A | * | 6/2000 | Phillips | 95/12 |
| 6,383,256 B1 | * | 5/2002 | Phillips | 95/12 |
| 6,712,876 B1 | * | 3/2004 | Cao et al. | 95/10 |
| 6,712,877 B1 | * | 3/2004 | Cao et al. | 95/10 |

FOREIGN PATENT DOCUMENTS

EP 0609620 A1 * 8/1994

* cited by examiner

*Primary Examiner*—Frank M. Lawrence
(74) *Attorney, Agent, or Firm*—MacMillan, Sobanski & Todd, LLC

(57) ABSTRACT

A method of controlling a gas adsorption apparatus including a sieve bed containing molecular sieve bed material, the bed being cyclically operable in a charge mode to adsorb non-product gas from an air supply thereby to increase the concentration of a product gas in a product gas supply which passes to a product gas line and in a vent mode to desorb the adsorbed non-product gas which passes to a non-product gas line, and there being a passage to permit a restricted amount only of the product gas supply to pass from the product gas supply line to the bed when operating in vent mode, and wherein the method includes operating a variable flow device to permit an increased amount of the product gas supply to pass to the bed when operating in vent mode, under predetermined conditions.

14 Claims, 5 Drawing Sheets

METHOD OF CONTROLLING A GAS ADSORPTION APPARATUS

BACKGROUND TO THE INVENTION

This invention relates to a method of controlling a gas adsorption apparatus and more particularly to a method of controlling a gas adsorption apparatus of the kind including at least two sieve beds each containing molecular sieve bed material, each bed being cyclically operable in a charge mode to adsorb non-product gas from an air supply thereby to increase the concentration of a product gas in a product gas supply which passes to a product gas line, and in a vent mode to desorb the adsorbed non-product gas which passes to a non-product gas line, the beds being operated so at least for some of the time when each of the beds is operating in charge mode, the other or another of the beds is operating in vent mode.

Such apparatus typically are utilized for providing a product gas supply with an increased concentration of oxygen, for breathing in an aircraft, at high altitudes.

A potential problem with such apparatus is that the molecular sieve bed material can be contaminated with contaminants such as water, which is particularly present in air which is supplied to the apparatus at altitudes below say, 15,000 feet. At altitudes above 15,000 feet, the air supply tends to be drier and thus presents less potential problems to the operation of the gas adsorption apparatus. Although free water can relatively easily be removed from the air supply, some entrained water vapor can remain.

DESCRIPTION OF THE PRIOR ART

To assist purging of the molecular sieve bed material in a bed being vented, it is known to provide to the venting bed, a small amount of the product gas supply. Particularly where such beds are operated in pairs, whilst one of the beds is operating in vent mode and the other is operating in charge mode, a small amount of the product gas supply from the bed operating in charge mode is fed into the venting bed. This dry and clean product gas supply assists purging of the non-product gas from the molecular sieve bed material, and replaces any damp and perhaps not so clean air present in the venting bed, so that when the bed is again operated in charge mode, the bed adsorbs non-product gas from the air supply more efficiently.

As indicated above the potential for bed contamination with water, but other contaminants too, is greatest at lower altitudes when in any event, less product gas supply, or at least a product gas supply with a smaller concentration of product gas is required.

BRIEF SUMMARY OF THE INVENTION

According to a first aspect of the invention we provide a method of controlling a gas adsorption apparatus of the kind including a sieve bed containing molecular sieve bed material, the bed being cyclically operable in a charge mode to adsorb non-product gas from an air supply thereby to increase the concentration of a product gas in a product gas supply which passes to a product gas line, and in a vent mode to desorb the adsorbed non-product gas which passes to a non-product gas line, and there being a passage to permit a restricted amount only of the product gas supply to pass from the product gas supply line to the bed when operating in vent mode, and characterized in that the method includes operating a variable flow device to permit an increased amount of the product gas supply to pass to the bed when operating in vent mode, under predetermined conditions.

Thus for example, where the gas adsorption apparatus is for producing a breathable product gas supply in an aircraft, above a threshold altitude, where for example the potential problem of contaminants being adsorbed by the molecular sieve bed material is less, a minimum amount of the product gas supply may be permitted to flow into the bed when operating in vent mode.

Preferably the method includes automatically operating the variable flow device at the threshold altitude in response to an altitude sensor input, to increase or reduce the amount of product gas supply passing to the venting bed, depending upon whether the aircraft is climbing or descending.

The gas adsorption apparatus may include at least two sieve beds each containing molecular sieve bed material, each bed being cyclically operable in charge mode and in vent mode, the beds being operated so at least for some of the time when each of the beds is operating in charge mode, the other or another of the beds is operating in vent mode. Product gas supply from each bed may thus, when operating in charge mode, pass to its own individual product gas supply line, which lines are connected downstream of a non-return valve, to a main supply system, the non-return valves preventing product gas passing from the main supply system to each respective sieve bed.

The first and second passages may conveniently extend between the product gas supply lines from the beds upstream of the non-return valves.

A first passage may be provided with a flow restrictor which permits the restricted amount of the product gas supply to pass to the bed or beds at all times, and the variable flow device may be provided in a parallel second passage.

In another arrangement, the variable flow device is provided in the passage and is operable under all conditions to permit at least the restricted amount of the product gas supply to pass from the product gas supply line to the bed when operating in vent mode, and to permit the increased flow under the predetermined conditions.

In one example the variable flow device is a simple shut-off valve, in combination with or otherwise containing a flow restrictor which restricts the gas flow to a maximum amount of the product gas supply when the shut-off valve is opened.

In another example, the variable flow device may be operated to permit infinitely or incrementally varying amounts of the product gas supply to flow to the bed or beds. Thus for example, where the aircraft is climbing or descending, the variable flow device may be operated to permit an infinitely or incrementally varying amount of product gas supply to flow to the bed or beds to match product gas supply demand to altitude.

Thus the invention may include sensing the concentration of product gas in the product gas supply available for breathing, as well as the aircraft altitude, and adjusting the variable flow device to ensure that a required concentration of product gas in the product gas supply is available for breathing.

According to a second aspect of the invention we provide a gas adsorption apparatus of the kind including a sieve bed containing molecular sieve bed material, the bed being cyclically operable in a charge mode to adsorb non-product gas from an air supply thereby to increase the concentration of a product gas in a product gas supply which passes to a product gas line, and in a vent mode to desorb the adsorbed non-product gas which passes to a non-product gas line, and there being a passage to permit a restricted amount only of the product gas supply to pass from the product gas supply line to the bed when operating in vent mode, and characterized in that the apparatus includes a variable flow device which is operable to permit an increased amount of the product gas supply to pass to the bed when operating in vent mode, under predetermined conditions.

The apparatus of the second aspect of the invention may have any of the features of the gas supply apparatus used to perform the method of the first aspect of the invention.

Conveniently, where the apparatus includes at least two sieve beds each containing molecular sieve bed material, each bed being cyclically operable in charge mode and in vent mode, the beds being operated so at least for some of the time when each of the beds is operating in charge mode, the other or another of the beds is operating in vent mode, the apparatus including for each sieve bed, an inlet valve and an outlet valve, each inlet valve being open when its respective bed is operated in charge mode, to allow air from the air supply to flow into the respective sieve bed, and each outlet valve being open when its respective bed is operated in vent mode, to allow desorbed non-product gas to flow from the respective sieve bed. The inlet and outlet valves may be controlled by control valves in response to a system controller.

Such valving arrangements are known in which the inlet and outlet valves are each diaphragm valves to which pressurized air is selectively fed to close the valves from respective powered control valves when energized. The diaphragms are moved to open the valves by gas pressure when no pressurized air is fed to them by the respective control valves. A potential problem with such an arrangement is that unless both valves are energized, none of the inlet and outlet valves is positively retained closed.

According to a third aspect of the invention we provide a gas adsorption apparatus of the kind including two sieve beds each containing molecular sieve bed material, each bed being cyclically operable in a charge mode to adsorb non-product gas from an air supply thereby to increase the concentration of a product gas in a product gas supply which passes to a product gas line, and in a vent mode to desorb the adsorbed non-product gas which passes to a non-product gas line, the beds being operated so that when a first of the beds is operating in charge mode, the second of the beds is operating in vent mode, the apparatus including for each sieve bed, an inlet valve and an outlet valve, each inlet valve being open when its respective bed is operated in charge mode, to allow air from the air supply to flow into the respective sieve bed, and each outlet valve being open when its respective bed is operated in vent mode, to allow desorbed non-product gas to flow from the respective sieve bed, and there being a pair of control valves to control the opening and closing of the inlet and outlet valves, and characterized in that a first of the control valves is operable generally simultaneously to open the inlet valve of the first of the beds and the outlet valve of the second of the beds, and a second of the control valves is operable generally simultaneously to open the outlet valve of the first bed and the inlet valve of the second bed.

Thus with such an arrangement, both control valves may be in the same state, e.g. de-energized, whilst all of the inlet and outlet valves may positively be retained closed.

For example where the inlet and outlet valves are each diaphragm valves to which pressurized air is selectively fed to close the valves, from respective powered control valves when de-energized, and the diaphragms are moved to open the valves by gas pressure of the inflowing gas supply or venting de-adsorbed gas, when no pressurized air is fed to them by the respective control valves, in an arrangement in accordance with the third aspect of the invention, where both of the powered control valves are de-energized, both of the inlet and outlet valves will be moved by pressurized air to close. Thus where for example the pair of beds is one of a plurality of such pairs, and the vented de-adsorbed gas is vented to ambient, when the pair of beds is rested, for example when no product gas supply is required from the gas adsorption apparatus, the molecular material of the sieve beds may be closed to both the gas supply and the ambient air to protect the molecular sieve bed from potential contamination.

The apparatus of the third aspect of the invention may have any of the features of the apparatus of the second aspect of the invention.

According to a fourth aspect of the invention we provide an aircraft having a gas adsorption apparatus according to the second or third aspects of the invention, for providing a breathing gas supply to aircrew or passengers.

BRIEF DESCRIPTION OF THE DRAWINGS

Embodiments of the invention will now be described with reference to the accompanying drawings in which:—

DETAILED DESCRIPTION OF THE INVENTION

Figure 4A:
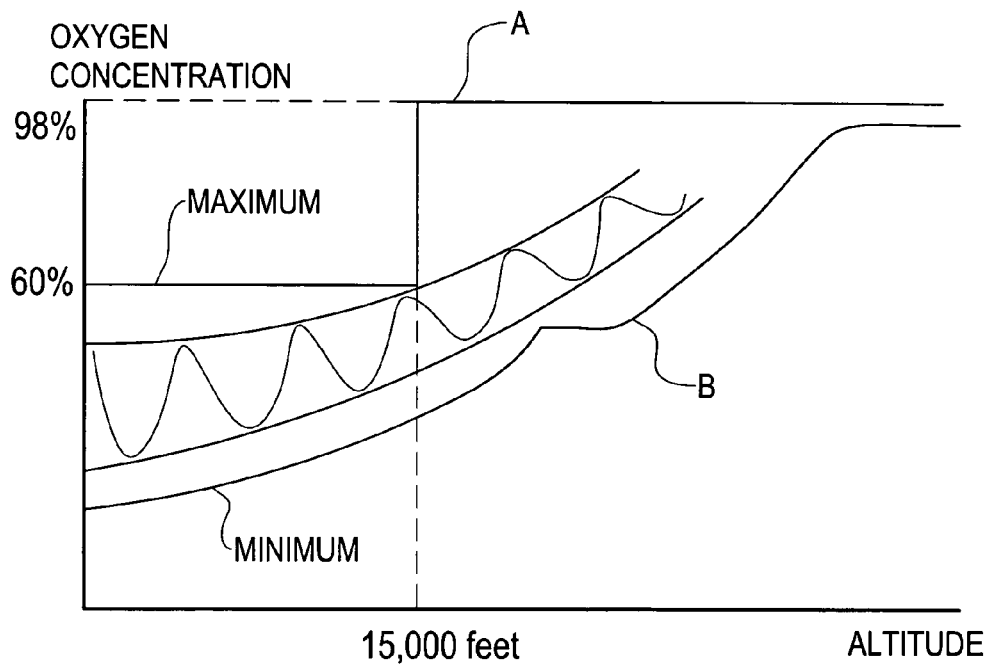
FIGS. 4a and 4b are graphs showing product gas concentration in a product gas supply against altitude for different parameters.

Referring first to FIG. 4, a graph shows at A, a maximum desired oxygen concentration in a breathing gas supply in an aircraft at different altitudes. This shows that at altitudes above 15,000 feet, desirably the oxygen concentration in the breathing gas supply as great as possible, which typically could be 90% if a gas adsorption apparatus to be described below, is of sufficient capacity and is operating at maximum efficiency. At high altitudes below 15,000 feet, whereas an enhanced oxygen concentration is still required, significantly less than 90% concentration is required, for example as shown, 60%.

At B there is shown for increasing altitude, the minimum oxygen concentration in a breathing gas supply, for the air crew or passenger's well being.

Using the invention, with a basic control regime for operating a gas adsorption apparatus, an actual oxygen concentration can be achieved which can vary within an envelope indicated on the graph at C, possibly as indicated by the wavy line.

Figure 4B:
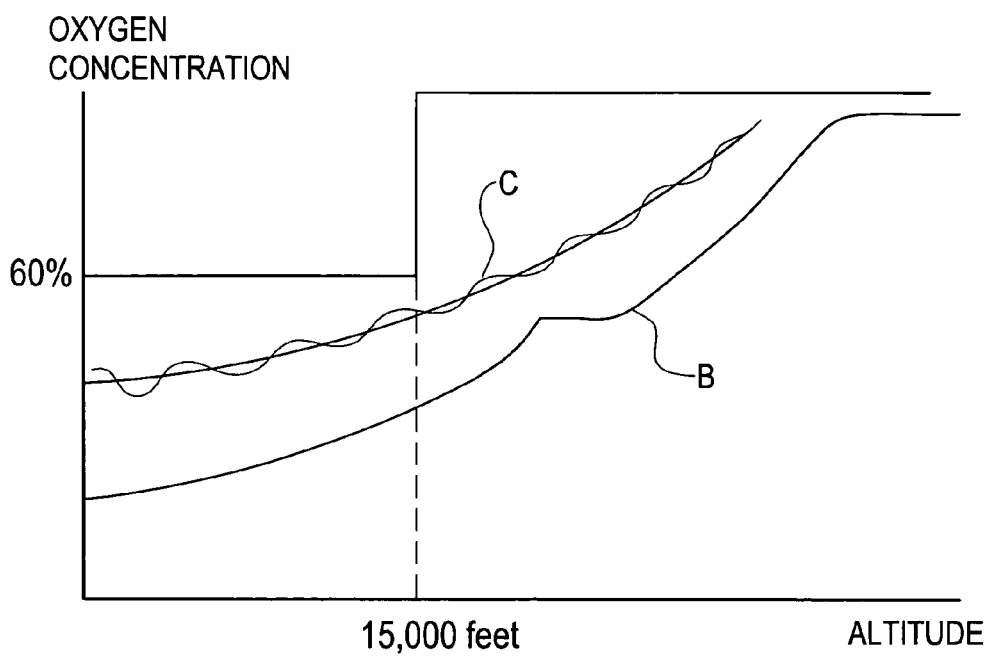

It is desirable even more closely to match actual oxygen concentration in the breathing gas supply, to the desired oxygen concentration, as indicated at C in FIG. 4b, and a more closer approximation to the line C in FIG. 4b can be achieved by the method and apparatus of the first and second aspects of the invention, controlled according to a more refined control regime or algorithm.

Figure 1:
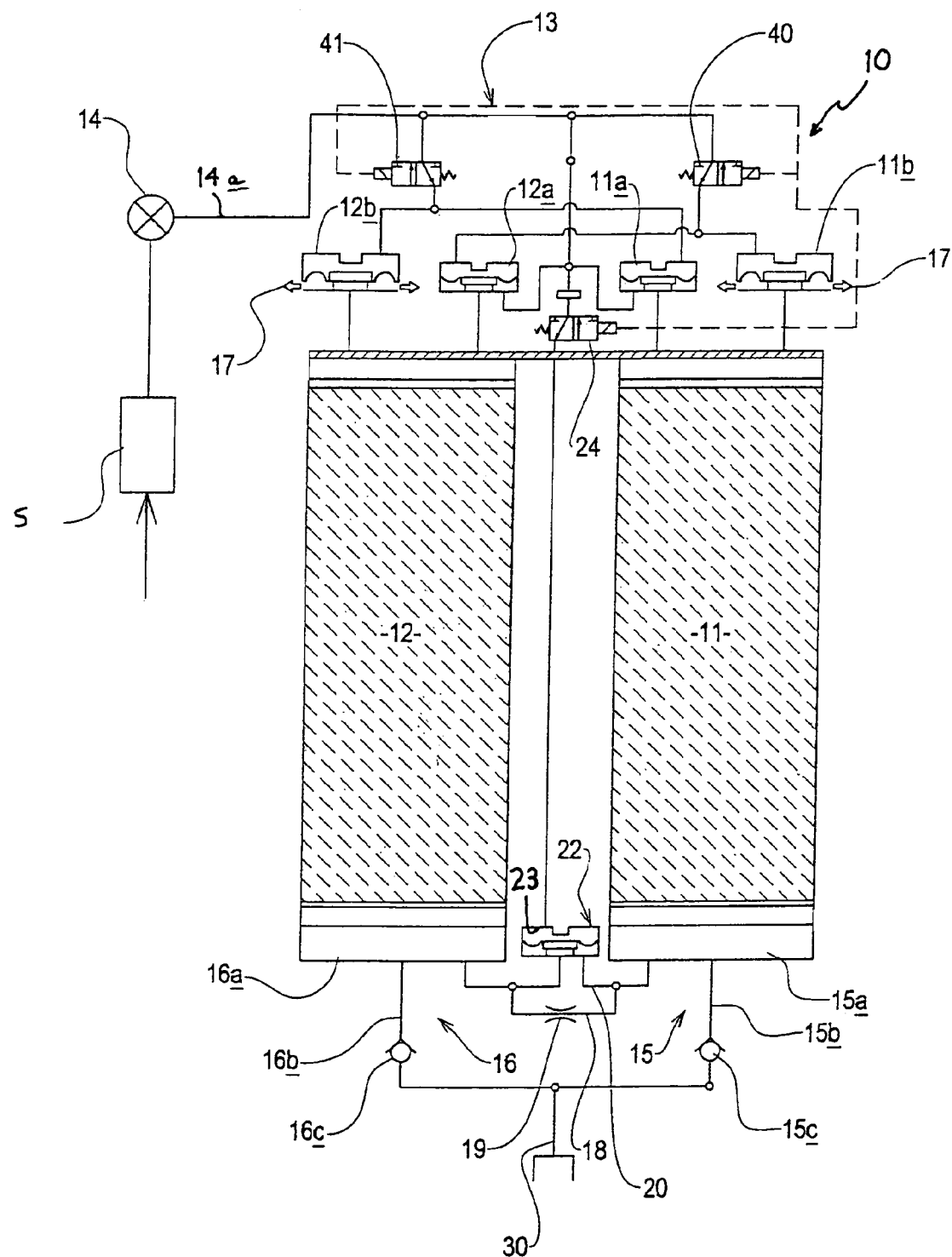
FIG. 1 is a diagrammatic side view of a gas adsorption apparatus in accordance with, and which may be operated in accordance with the present invention.

Referring now to FIG. 1, there is shown a gas adsorption apparatus 10 which in this example includes a pair of molecular sieve beds 11, 12 which each contain molecular sieve bed material, such as Zeolite, which in use adsorbs nitrogen and other non-oxygen gas from a supply of air. The gas which passes through the beds 11, 12 thus has an enhanced concentration of product gas, namely oxygen.

In this example, the air supply S is provided via a pressure reducing valve 14 from a compressed air section of an aircraft engine. The pressure reducing valve 14 connects to a line 14a. This so called bleed air, is thus pressurized, even after passing through the pressure reducing valve 14. Particularly at low altitudes, the air supply may be damp, containing entrained moisture.

The air passes into one of the beds, for example the first bed 11, via a valving arrangement 13 as will be described in detail below, in a charge mode, so that non-product gas is adsorbed from the air before passing into a respective product gas supply line 15, which includes a manifold 15a and feed line 15b. At the same time, the air supply S is isolated from the second bed 12 by the valving arrangement 13, but the bed 12 is vented to ambient, low pressure, conditions, so that adsorbed non-product gas is vented from the bed 12 via a vent line 17 whereby the bed 12 is purged.

Subsequently, the valving arrangement 13 is operated so that the second bed 12 receives the air supply and provides a product gas supply to a respective product gas supply line 16, which includes a manifold 16a and a feed line 16b whilst the first bed 11 is vented to the vent line 17, and so on cyclically. Each feed line 15a, 16a for product gas supply, includes a respective non-return valve 15c, 16c to prevent product gas supply passing back from a main supply system 30 to which each of the product gas supply lines 15, 16 is connected, to either of the beds 11, 12, but to permit the substantially unfettered flow of product gas supply from the beds 11, 12 to the main supply system 30 when the respective beds 11, 12 are operating in charge mode.

Preferably for at least some of the time, and preferably substantially all of it, where a pair of beds 11, 12 is provided as shown, when either of the beds 11, 12 is operating in charge mode, the other of the beds 12, 11 is operating in vent mode, so that the two beds 11, 12 are operated in tandem. Where more than two beds 11, 12 are provided any desired control regime which permits the beds to operate cyclically to charge and vent, in combination with other beds venting and charging may be adopted. In each case though, all of the beds contribute product gas supply with an enhanced concentration of product gas to a main supply 30 when operating in charge mode, and vent desorbed non-product gas when operating in vent mode.

Because, particularly at low altitudes, the molecular sieve bed material can adsorb contaminants from the air supply, to assist purging of the beds 11, 12 when operating in vent mode, a small amount of the product gas is passed into the beds 11, 12 when venting.

In the figure, a first passage 18 is shown which extends between the respective manifolds 15a, 16a and contains a flow restrictor 19 which restricts the flow through the passage 18 to a fixed small amount. Thus for example when the first bed 11 is operating in charge mode and the second bed 12 is operating in vent mode, a small amount of the product gas produced by the first bed 11 passes into the second bed 12 via the manifold 16a, to assist purging.

In accordance with the invention, the apparatus 10 includes a second passage 20 which extends between the manifolds 16a, 16b and which includes a variable flow device 22 which may be operated to permit an increased amount of the product gas supply to flow between the beds 11, 12. In FIG. 1, the variable flow device 22 shown is a diaphragm valve which is closed when pressurized air is provided to a chamber 23 of the valve 22 from a control valve 24, the pressurized air being derived from the air supply S, and the control valve 24 being controlled by a controller 26 (not shown in FIG. 1 but shown in FIG. 2).

Figure 2:
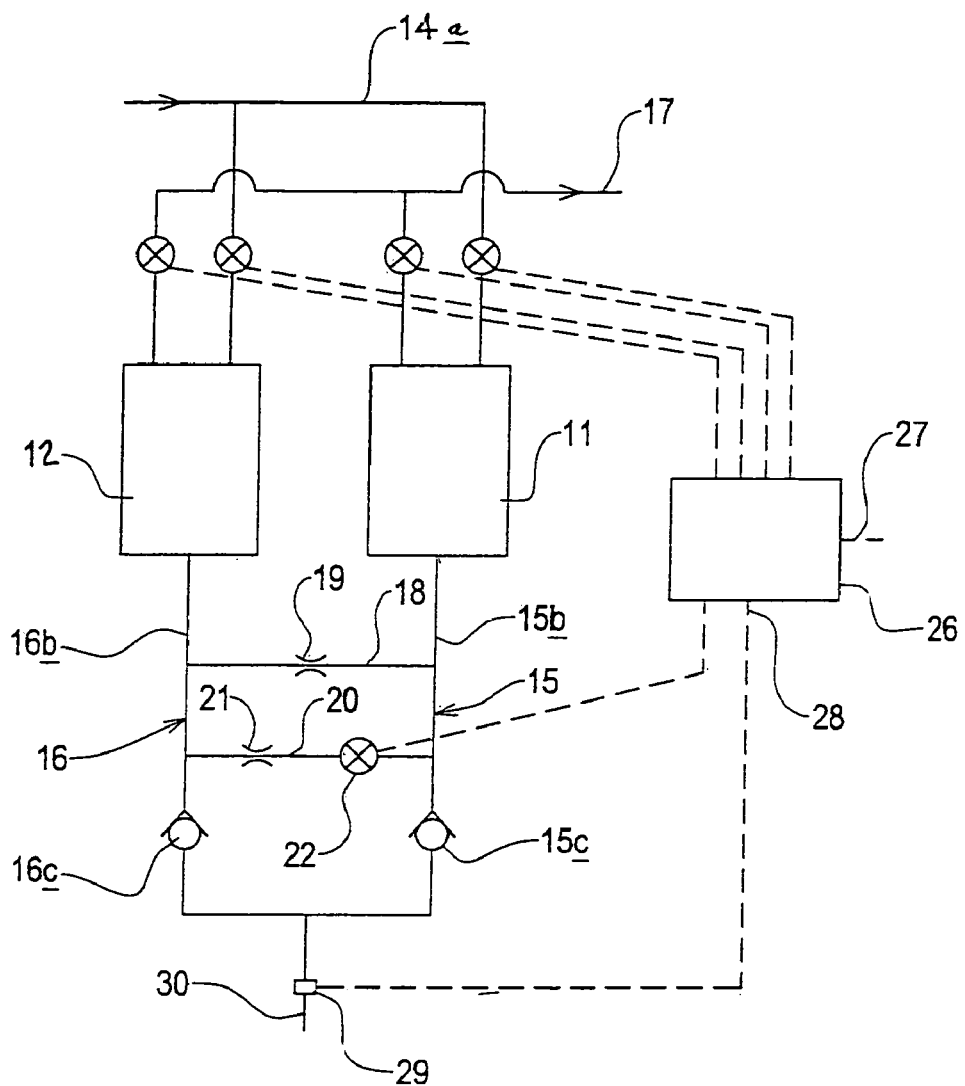
FIG. 2 is an enlarged and explanatory view of part of the apparatus of FIG. 1.

The variable flow device 22 may be a simple shut-off valve, as indicated in the representation shown in FIG. 2, which is in series in the second passage 20 with a fixed flow restrictor device 21 similar to the restrictor 19 of the first passage 18. When the variable flow device 22 is closed, product gas supply may only pass between the beds 11, 12 via the first passage 18; when the variable flow device 22 is open, a maximum flow of product gas supply may flow between the beds 11, 12 (from the charging bed to the venting bed) to the extent permitted by the fixed flow restrictors 19 and 21.

Figure 2A:
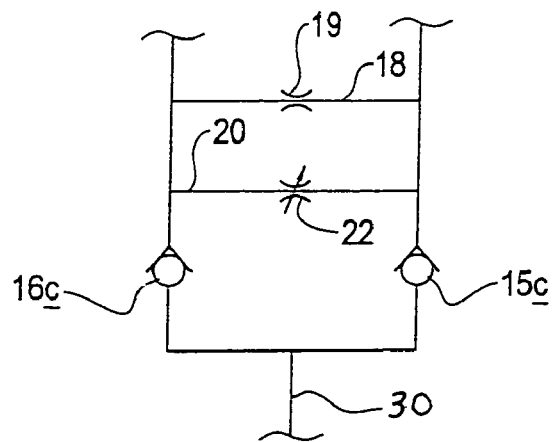
FIG. 2a shows a modification of the apparatus of FIG. 2.

In FIG. 2a a modified arrangement is shown in which the variable flow device 22 is capable of metering the flow of product gas infinitely or incrementally through the second passage 20 depending on its extent of opening as controlled by the controller 26.

In accordance with the invention, the variable flow device 22 is operated automatically to vary product gas supply flow, depending on aircraft altitude. In the case of the variable flow device 22 being a simple shut-off valve, the valve 22 may be arranged to close when the aircraft reaches a threshold altitude, say 15,000 feet, as the aircraft climbs, and to open when the aircraft descends to 15,000 feet. Thus the controller 26 may respond to an input 27 from an altimeter to open and close the variable flow (shut-off) device.

In the case of the variable flow device 22 being capable of metering product gas supply flow, again the controller 26 may open and close the device 22 to varying degrees, depending on sensed altitude.

As shown in FIG. 2, if desired, the controller 26 may too respond to an input 28 from an oxygen concentration sensor 29, and the controller 26 may also control the valving arrangement 13 for the two beds 11, 12, as hereinafter explained.

Figure 2B:
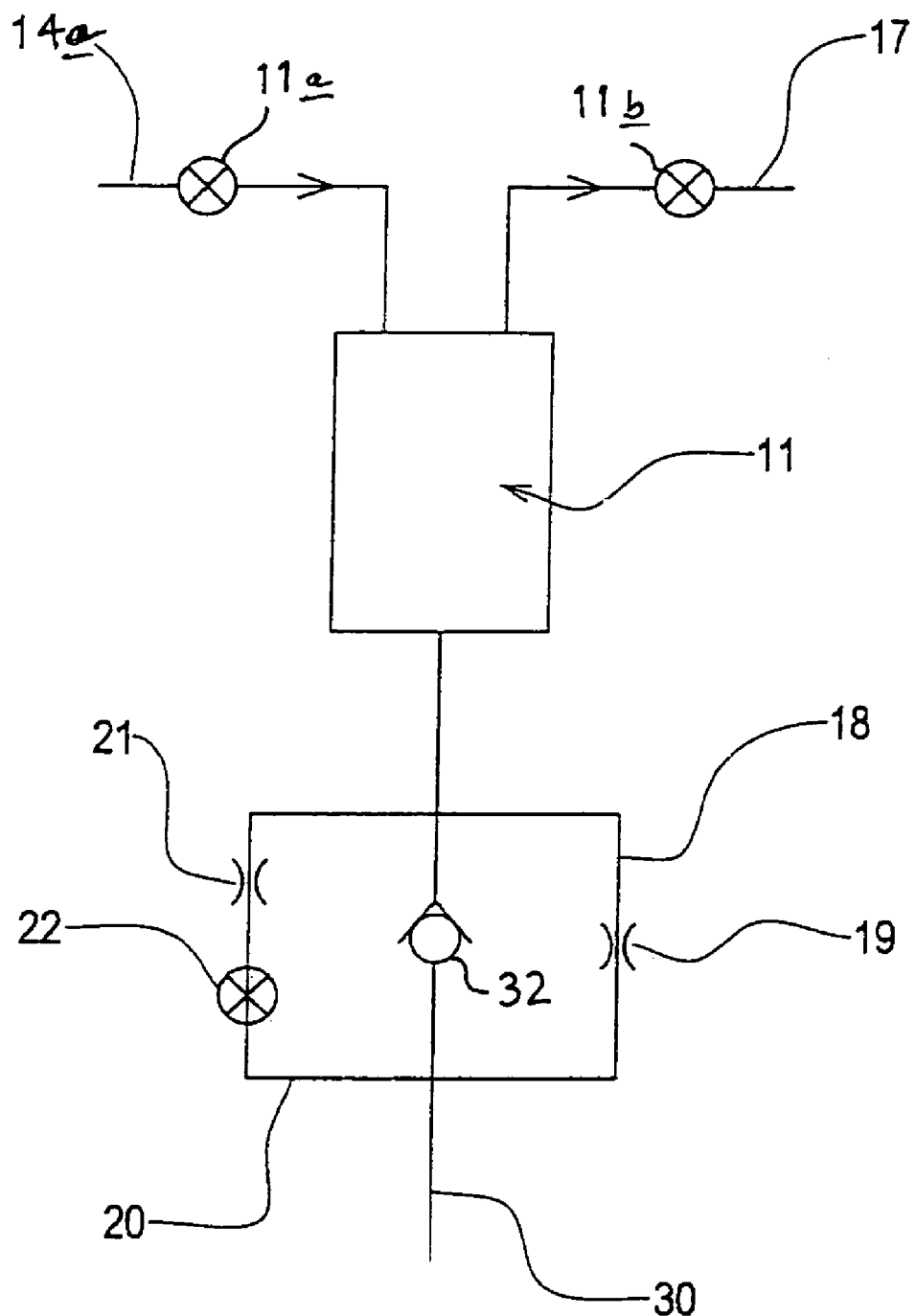
FIG. 2b is yet another modification of the apparatus of FIG. 2, but showing a single molecular sieve bed only.

In FIG. 2b, a modified arrangement for a single molecular sieve bed 11 apparatus is shown. Here, product gas supply may pass from the bed 11 when operating in charge mode, into a main breathing gas supply 30 via a one way isolating valve 32 which permits the unfettered flow of product gas to the main supply 30, but prevents the flow of product gas supply past the valve 32 to the bed 11.

The first passage 18 is provided in parallel with the non-return valve 32, as does the second passage 20. Thus product gas supply may flow from the main supply 30 to the bed when the bed 11 is venting, via the fixed flow restrictor 19 in the first passage 18, and via the variable flow device 22 in the second passage 20, and any fixed flow restrictor 21.

In accordance with the invention, by operating the gas adsorption apparatus 10 by varying the amount of product gas supply fed to a venting bed depending upon altitude, the actual oxygen concentration in the product gas supplied for breathing may be closer to the desired concentration for a given altitude. Moreover, at lower high altitudes, more dry and clean product gas supply is made available for assisting purging of the venting beds 11, 12, as is desirable.

In another embodiment, instead of providing a (fixed) flow restrictor 19 and the variable flow device 22 in respective first and second passages 18, 20, a single passage with a variable flow device 22 would need to be operable in all conditions to permit at least the restricted amount of the product gas supply to pass from the product gas supply line to the bed or beds when operating in vent mode, and to permit increased flow under predetermined conditions, such as below a threshold altitude.

Figure 3:
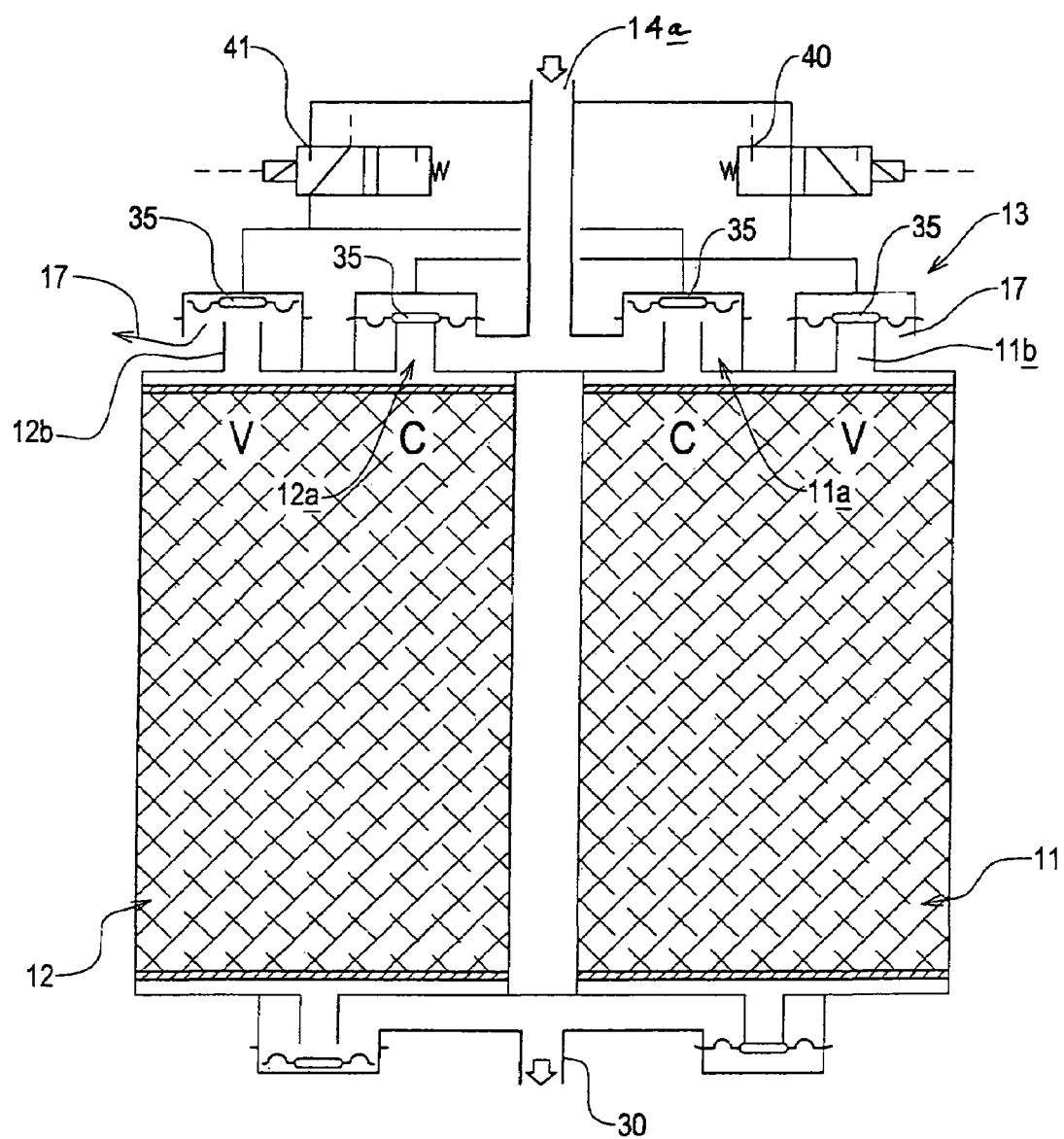
FIG. 3 is a diagrammatic side view of a gas adsorption apparatus in accordance with the third aspect of the invention.

Referring now to FIG. 3, a valving arrangement 13 for the pair of sieve beds 11, 12 will be described.

Each bed 11, 12 includes an inlet valve 11a, 12a, and an outlet valve 11b, 12b. During charging, of either bed, say bed 11, the respective inlet valve 11a is opened and the respective outlet valve 11b is closed, whilst for the other bed 12 which is operating in vent mode, the inlet valve 12a will be closed and the outlet valve 12b will be opened.

The inlet and outlet valves 11a, 12a; 11b, 12b are in this example diaphragm valves, each containing a diaphragm 35 in a respective chamber to which pressurized air may be supplied to move the diaphragm to a closed position, as seen for the inlet valve 12a and outlet valve 11b in FIG. 3.

When the pressurized air supply is stopped, the diaphragms 35 will move to an open position, seen for outlet valve 12b and inlet valve 11a in FIG. 3, due to the action of venting non-product gas and incoming air supply respectively.

The pressurized air to close the inlet and outlet valves 11a, 12a; 12a, 12b is supplied via powered control valves 40, 41. In accordance with the third aspect of the invention, the control valves 40, 41 are operated so that in the event that both are is de-energized, pressurized air is supplied to all the respective inlet and outlet valves 11a, 12a; 11b, 12b so that all the diaphragms 35 are maintained closed against their respective valve seats.

In this example one control valve 40, when de-energized permits pressurized air to pass from the air supply S and pressure reducing valve 14, to the chambers of the outlet valve 11b of the first bed 11 and to the inlet valve 12a of the second bed 12, and at the same time, the second control valve 41 is energized to permit pressurized air to pass to the chambers of the inlet valve 11a of the first bed 11 and the outlet valve 12b of the second bed 12 so that the first bed 11 operated in charge mode and the second bed in vent mode, and vice versa when the first control valve 40 is energized and the second control valve 41 is de-energized. The control valves 40, 41 may be simple solenoid operated powered valves or other type of valve, which automatically return to a datum condition when de-energized, such as to permit pressurized air to flow to the connected inlet/outlet valves 11a, 12a; 11b, 12b.

Thus in the event of, for example the aircraft flying at an altitude below that required for the gas adsorption apparatus 10 to operate, or the demand for product gas falls to a level where the product gas may be supplied by an alternative gas supply apparatus, the molecular sieve material of the beds 11, 12 may be isolated from the ambient air 17 and the air supply S, to protect the material from contamination.

The example of FIG. 3 does not include the passages 18, 20 of the FIGS. 1, and 2 to 2b arrangements, but may do so as required.

The invention claimed is:

1. A method of controlling a gas adsorption apparatus for producing a breathable product gas supply for a main supply system in an aircraft including at least one sieve bed containing molecular sieve bed material, the sieve bed being cyclically operable in a charge mode to adsorb non-product gas from an air supply thereby to increase the concentration of a product gas in a product gas supply line which passes to a product gas supply, and in a vent mode to desorb the adsorbed non-product gas which passes to a non-product gas line, and there being at least one passage to permit a restricted amount only of the product gas supply to pass from the product gas supply line to the bed when operating in the vent mode, and wherein the method includes operating a variable flow device to permit an increased amount of the product gas supply to pass to the bed when operating in the vent mode, under predetermined conditions, wherein at above a threshold altitude a minimum amount of the product gas supply is permitted to flow into the bed when operating in the vent mode, and further including the step of automatically operating the variable flow device in response to an altitude sensor input, to increase or reduce the amount of product gas supply passing to the venting bed at the threshold altitude, depending upon whether the aircraft is climbing or descending.

2. A method according to claim 1 wherein said at least one gas adsorption apparatus comprises at least two sieve beds each containing molecular sieve bed material, each sieve bed being cyclically operable in charge mode and in vent mode, and wherein the beds are operated so at least for some of the time when each of the beds is operating in charge mode, the other or another of the beds is operating in vent mode.

3. A method according to claim 2 wherein product gas supply from each bed, when operating in charge mode, passes to its own individual product gas supply line, which lines are connected downstream of a non-return valve, to a main supply system, the non-return valves preventing product gas passing from the main supply system to each respective sieve bed.

4. A method according to claim 3 wherein first and second passages are provided to extend between the product gas supply lines from the beds upstream of the non-return valves.

5. A method according to claim 1, wherein two parallel passages are provided to permit a restricted amount only of the product gas supply to pass from the product gas supply line to the bed when operating in the vent mode, wherein a first of the parallel passages is provided with a flow restrictor which permits a restricted amount of the product gas supply to pass to the bed or beds at all times, and the variable flow device is provided in a second of the parallel passages.

6. A method according to claim 1 wherein the variable flow device is provided in the at least one passage and is operable under all conditions to permit at least the restricted amount of the product gas supply to pass from the product gas supply line to the bed when operating in vent mode, and to permit the increased flow under the predetermined conditions.

7. A method according to claim 1 wherein the variable flow device is a simple shut-off valve, in combination with or otherwise containing a flow restrictor which restricts the gas flow through to a maximum amount of the product gas supply when the shut-off valve is opened.

8. A method according to claim 1 wherein the variable flow device is operable to permit infinitely or incrementally varying amounts of the product gas supply to flow to the bed or beds.

9. A method of controlling a gas adsorption apparatus for producing a breathable product gas supply in an aircraft including at least one sieve bed containing molecular sieve bed material, the sieve bed being cyclically operable in a charge mode to adsorb non-product gas from an air supply thereby to increase the concentration of a product gas in a product gas supply line which passes to a product gas supply, and in a vent mode to desorb the adsorbed non-product gas which passes to a non-product gas line, and there being a passage to permit a restricted amount only of the product gas supply to pass from the product gas supply line to the bed when operating in vent mode, and wherein the method includes operating a variable flow device to permit an infinitely or an incrementally varying increased amount of the product gas supply to pass to the bed when operating in vent mode, under predetermined conditions, wherein at above a threshold altitude a minimum amount of the product gas supply is permitted to flow into the bed when operating in vent mode and wherein as the aircraft climbs and descends, the variable flow device is operated to permit an infinitely varying amount of product gas supply to flow to the bed or beds to match product gas supply demand to altitude.

10. A method according to claim 8 wherein the gas adsorption apparatus is for producing a breathable product gas supply in an aircraft, and at above a threshold altitude a minimum amount of the product gas supply is permitted to flow into the bed when operating in vent mode and wherein the method includes sensing the concentration of product gas in the product gas supply available for breathing, sensing the aircraft altitude, and adjusting the variable flow device to ensure that a concentration of product gas in the product gas supply is available for breathing.

11. A gas adsorption apparatus for use in an aircraft including at least one sieve bed containing molecular sieve bed material, flow control valves connected to alternately operate each bed in a charge mode to adsorb non-product gas from an air supply thereby to increase the concentration of a product gas in a product gas supply which passes to a product gas line, and in a vent mode to desorb the adsorbed non-product gas which passes to a non-product gas line, and there being a passage to permit a restricted amount only of the product gas supply to pass from the product gas supply line to the bed when operating in vent mode, and characterized in that the apparatus includes a variable flow device which is operable to permit an increased amount of the product gas supply to pass to the bed when operating in vent mode, under predetermined conditions, and wherein the variable flow device is operatively connected to an altitude sensor.

12. An apparatus according to claim 11 wherein said at least one molecular sieve bed comprises at least two sieve beds each containing molecular sieve bed material, each bed being cyclically operable in the charge mode and in the vent mode, the beds being operated so at least for some of the time when each of the beds is operating in the charge mode, the other or another of the beds is operating in the vent mode, the apparatus including for each sieve bed, an inlet valve and an outlet valve, each inlet valve being open when its respective bed is operated in charge mode, to allow air from the air supply to flow into the respective sieve bed, and each outlet valve being open when its respective bed is operated in the vent mode, to allow desorbed non-product gas to flow from the respective sieve bed.

13. An apparatus according to claim 12 wherein the inlet and outlet valves are controlled by control valves in response to a system controller.

14. An apparatus according to claim 13 wherein the inlet and outlet valves are each diaphragm valves to which pressurized air is selectively fed to close the valves from powered control valves when de-energized.

* * * * *